Jan. 17, 1967     D. McKINLAY     3,298,521
WATER FILTRATION BED AND METHOD OF PRODUCING SAME
Filed Dec. 23, 1963     2 Sheets-Sheet 2
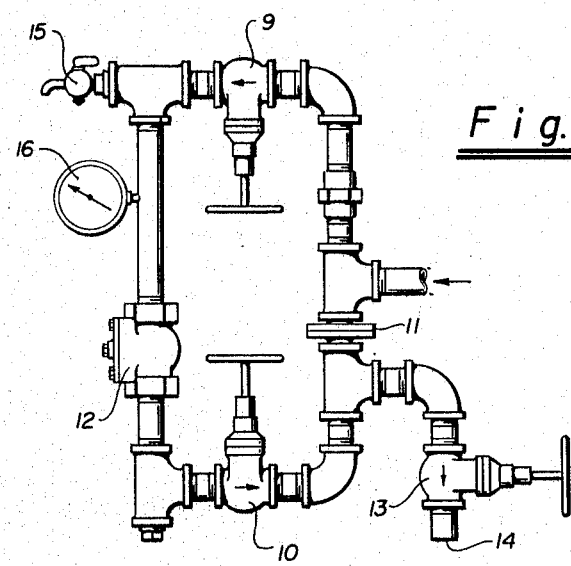
Fig. 2
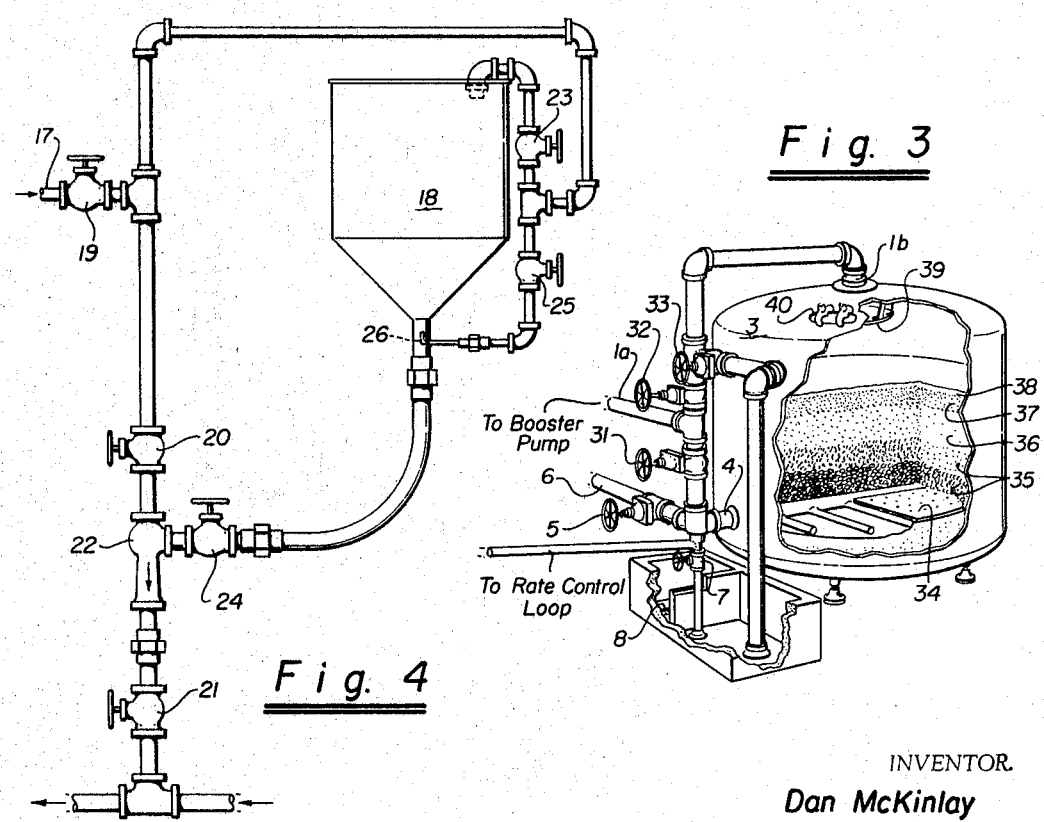
Fig. 3
Fig. 4
INVENTOR.
Dan McKinlay
BY Alfons Finishes
Attorney

United States Patent Office 3,298,521
Patented Jan. 17, 1967

3,298,521
WATER FILTRATION BED AND METHOD
OF PRODUCING SAME
Dan McKinlay, 24 California St.,
San Francisco, Calif. 94111
Filed Dec. 23, 1963, Ser. No. 332,459
10 Claims. (Cl. 210—75)

My invention relates to water filters primarily of the pressure type employing a bed of granular filter medium.

The filters of this type usually employ sand of various degrees of size or grading as a filter medium and are used to remove from the raw water solids or matter in suspension such as dirt, iron, organic matter, and other solid materials entrained in the raw water.

The successful removal of very fine particles with this type of filtration has heretofore proved to be impossible due to the natural physical characteristics of the filter sand itself. In an attempt to improve these conditions certain chemical coagulants such as filter alum have been used as a filter aid in this type of filter, but these are cumbersome and expensive in most cases and entirely unsuited in others. For example, in the manufacture of carbonated beverages where a very high degree in quality of the filtered water is essential for the manufacture of highest class beverages, the use of chemical coagulants is prohibited and high quality water may be obtained only by additional filtration steps through specially constructed and costly polishing filters.

It has been known in the filtration art for some time that diatomaceous earths or diatomities are well suited for filtering out extremely minute particles from water. Diatomite itself is comprised of extremely tiny particles, the handling of which in a filter has occasioned considerable difficulty necessitating the use of supporting membranes and filtration equipment of specialized and expensive construction. The latter, in turn, have proved quite expensive to operate and maintain.

It is therefore an object of my invention to provide a sand pressure water filter and method which would remove extremely fine particles of solids and matter in suspension more efficiently and economically than has been done heretofore.

It is another object of my invention to improve the operation of a pressure filter using sand or other granulated material so that it would be effective in obtaining high quality filtration without the use of chemical coagulating.

It is yet another object of my invention to make possible the use of diatomite in the filtration of water without resorting to complicated and expensive equipment and procedure.

It is still another object of my invention to provide a method of obtaining high quality filtered water without altering the chemical composition of the water in any way and particularly its pH which will be understood by those skilled in the art.

It is a more specific object of my invention to make possible the use of diatomite as a filter aid in existing pressure filters without any significant changes in the filter construction arrangement or operation.

Other objects will be apparent to those skilled in the art from the description which follows:

I have discovered that by properly mixing and dispersing a predetermined amount of diatomite in water it is possible to introduce this dispersion into a pressure filter in a manner such that the diatomite is kept in suspension until it fills the voids and forms a coating and then a complete homogeneous film over the top surface of a pressure filter bed thereby providing effective diatomite filtration.

I have discovered further that my method completely fills the voids in the sand or other material used in the pressure filter on its upper surface without appreciably penetrating the latter.

I have discovered still further that by the use of my method there are no holes or openings left in my diatomite bed through which water could by-pass or stratify to nullify the effect of the diatomite.

The method and apparatus of my invention will be evident to those skilled in the art from the description which follows and from the accompanying drawings, in which:

FIG. 2 is that part of my invention which comprises the rate control loop.

FIG. 3 represents a conventional pressure filter, partially cut away, showing how it may be adapted to the practice of my invention.

FIG. 4 is the diatomite applicator of my invention.

Figure 1:
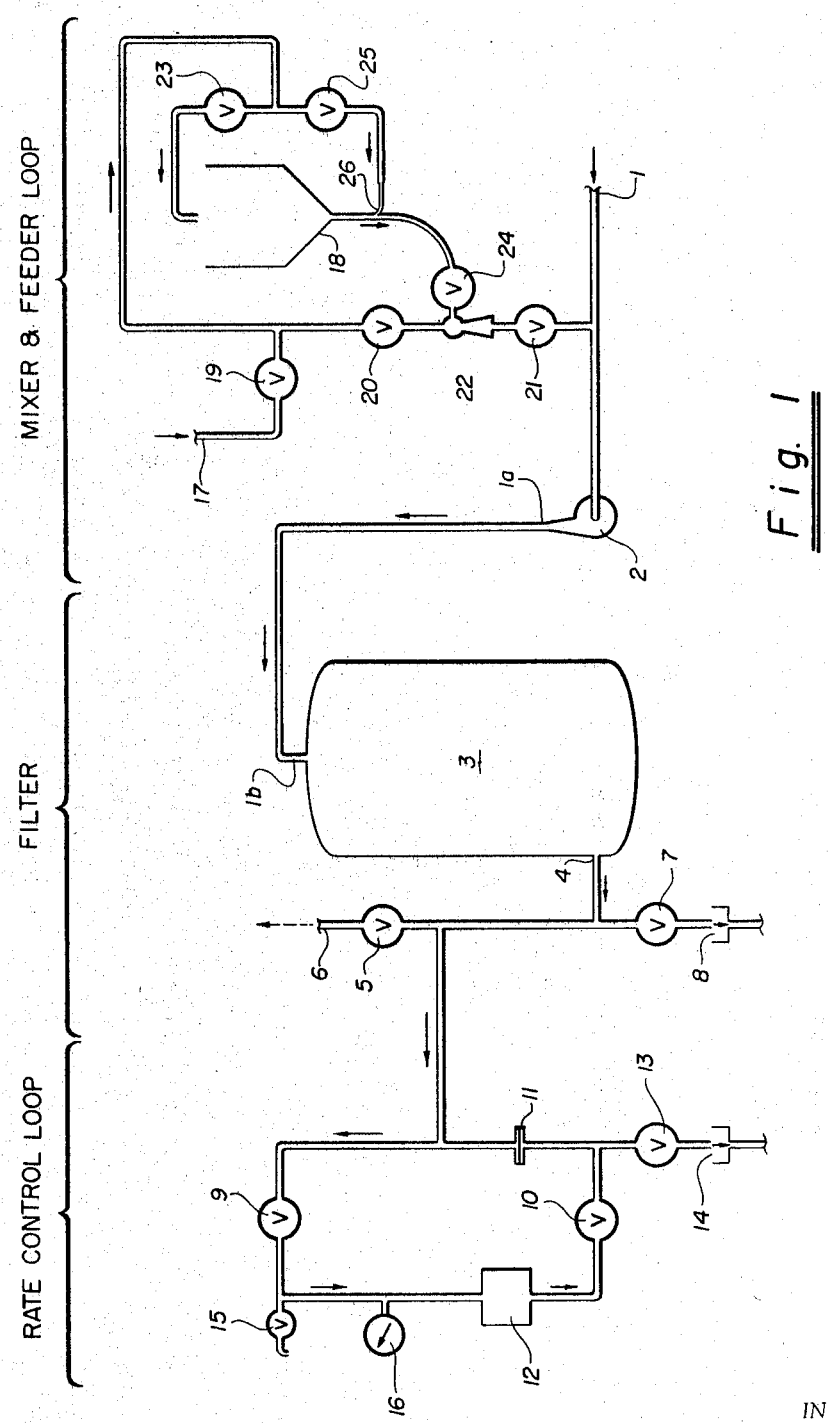
FIG. 1 is a complete diagrammatic flow sheet of the method of my invention.

Referring now to FIG. 1, a raw water supply which is to be filtered enters the system at 1 by means of pump 2, sometimes referred to as a booster pump customarily of the centrifugal type, which water is pumped into the top of pressure filter 3 which may be of a conventional type described more fully below. The filtered water leaves the filter 3 at point 4 located near the bottom through valve 5 and then out to the point of consumption indicated at 6. If it is desired to run this water or drain the filter, this may be done by closing valve 5 and opening valve 7 thus communicating with drain 8. Valves 5 and 9, the functions of which are more fully described below, remain closed during this operation as does valve 13.

Valves 9 and 10 provide communication between the outlet of filter 3 and the rate control loop of my invention. The function of the loop is to maintain a definite and constant flow of water through the filter during the period that the diatomite is being applied to the filter bed, as more fully described below. When valves 5 and 7 are closed and valves 9 and 10 are open, water flows into the aforesaid loop. The blind flange 11 causes water to flow in the direction indicated, through valve 9 and into the rate control valve 12 of my invention; thence through valve 10 and through valve 13 which has been opened for this purpose, and out through drain 14 and then to waste. The sampling cock 15 permits the testing of this water which passes through the filter while check gauge 16 indicates the pressure on the inlet side of rate control valve 12, as well as a visual check on the proper functioning of this valve.

The rate control valve 12, which may be of the ball type, is set for a fixed rate of flow depending on the size of the filter, after which it is sealed and rendered inoperative, thus providing a constant orifice for governing the rate of flow at a constant and predetermined figure. This predetermined flow predominates in hydraulic importance for the successful operation of my invention. The latter is true because I have discovered that there is a certain critical velocity of water through the filter which permits the diatomite being introduced to remain in suspension as it is passing through the filter and to be uniformly deposited over the surface of the filter bed, as more fully explained below. I have discovered this critical velocity to be that produced inside the filter and through the bed by a flow of water equal to one gallon per square foot of filter area per minute (plus or minus 6 percent) as further described below.

The rate control loop of my invention is shown more fully in FIG. 2 in which like numbers indicate like parts of this loop.

Referring again now to FIG. 1, and particularly the right hand side thereof, there is seen a mixer and feeder loop which comprise a part of the applicator of my invention.

Raw water under pressure from a booster pump or city supply is introduced at 17 to the applicator. Valve 19 permits this water to pass either into the mixer loop serving the diatomite mixer 18 through valves 23 and 25, or into the feeder loop through valve 20 and 21 or both simultaneously, as explained more fully below.

Valves 23 and 25 of the mixer loop provide communication with the top or inlet and bottom or outlet of the mixer 18 of my invention which comprises primarily a cylindrical steel or copper tank having a conical bottom or outlet. In the outlet connection is positioned a jet 26 which comprises a nozzle located within the outlet pipe of mixer 18 and pointed upwards into said mixer to provide a stream of water for agitation purposes to keep the diatomite in suspension.

The outlet from mixer 18 communicates through valve 24 to the suction or inlet of the eductor 22. The latter comprises part of the feeder loop. The latter may be a standard type of hydraulic eductor or injector comprising a velocity inlet nozzle, a suction connection, and a venturi shaped outlet, such as is well known to those skilled in the art. Valve 20 permits communication between the inlet of water under pressure at 17 and the eductor nozzle and valve 24 permit communication between the suction of the eductor and the mixer. Valve 21 permits communication between the outlet of the eductor 22 and the inlet or suction of booster pump 2.

The applicator of my invention is shown more fully in FIG. 4 in which like numbers indicate like components of my invention.

FIG. 3 shows a conventional type of pressure sand filter to which my invention has been adapted. This type of filter is well known to those skilled in the art and like numbers indicate the connection and corresponding components of my invention.

In addition to the items previously shown, there are seen in FIG. 3 beside the typical pressure filter tank 3, other standard connections and components as follows. Valve 31 and its accompanying piping provide a by-pass between lines 1b and 6 and together with valves 32 and 33 and the accompanying piping, make provisions for backwashing of the filter by pumping water through it backwards, that is, into the bottom and out of the top and then out to waste. This must be done periodically to cleanse the filter bed, as is well known to those skilled in the art, and as more fully discussed in connection with my invention below.

The interior of the filter tank 3 may be provided with a perforated plate 34 or a solid plate with a system of under drains on which there may be superimposed a layer of gravel 35, followed by a layer of coarse sand 36 and then fine sand 37. The latter features or components may be made to vary with different types of filters and my invention works equally well with any arrangement of the elements which may be adopted. The fine, uniform, homogeneous, and continuous layer of diatomite is shown deposited on the upper surface and within the sand voids of the filter at 38. The standard filter tank 3 may be provided with an inlet baffle 39 and an access manhole 40.

OPERATION

The operation of my invention will now be understood from the following description with reference to the figures.

The filter 3 is first backwashed by utilizing the piping and connections shown on FIG. 3 and described briefly above. Valves 31 and 33 are then closed, leaving the filter under pressure from the booster pump 2. Valves 5 and 7 remain closed and valves 9, 10, and 13 are open to their full capacity. This permits a flow of water through the filter and the rate control loop and out to waste 14. The rate of this flow is governed by the setting of the rate control valve 12, namely, to one gallon per square foot per minute (plus or minus 6 percent) as mentioned above. The filter bed is now ready to receive its diatomite.

Valves 19, 20, and 21 are opened and water continues to flow through the filter at the predetermined rate, but now some of it passes through the eductor 22 prior to entering the suction of booster pump 22. Valve 23 is then opened, permitting water to flow into mixer 18 and valve 24 is opened a sufficient amount to balance the water entering the mixer which, of course, is fed into the pump suction to eductor 22. A predetermined amount of diatomite is then introduced into the mixer 18 and valve 25 is opened permitting a relatively small quantity of water to enter through the jet 26 causing continuous agitation of the water in mixer 18 and effecting a thorough dispersion of the diatomite introduced into the mixer 18.

All of the water flow in the mixer and feeder loop will then come to equilibrium with the water being introduced at points 17 and 1 and the diatomite, which is now in suspension in the water coming from the mixer, will be introduced into the pump suction through the eductor 22. The latter flow, of course, will still be that governed by rate control valve 12, namely, one gallon per square foot per minute. The action of booster pump 2 will have the effect of helping to keep the diatomite in proper dispersion in the water. This is continued until all of the predetermined quantity of diatomite has been pumped into the filter 3, an operation which for the usual size of filter would require from four to five minutes. Valves 23, 24, and 25 are then closed, followed by valve 19, and the system permitted to operate an additional ten minutes or slightly more, to insure sufficient time for all of the diatomite to properly settle upon the top of the filter bed. Valves 20 and 21 may be left open.

For some installations I have found it desirable to use a combination of two different grades of diatomite forming two layers superimposed on one another as shown in the example below and in these cases the above operation is repeated again with the second batch of diatomite.

Check gauge 16 must at all times maintain a constant reading which is established by the setting of rate control valve 12 and insures that the diatomite is being applied at the proper rate in accordance with my invention.

Upon completion of the above operation, valve 5 is opened and valves 19, 20, and 21 are closed and approximately ten minutes later valves 9 and 10 are closed and the filter is in normal operation. Now, however, it is filtering through a diatomite layer, as well as the sand bed.

While it has hitherto been thought physically impossible to deposit a layer of such a fine material as diatomite directly upon the surface of a sand or similar filter bed, because of the tendency of the fine diatomite to penetrate into the bed and leave scattered bare spots or to pile up around the edges or center of the filter bed and leave large exposed areas of sand, I have been able to overcome this problem by the use of the method and apparatus above described. This I attribute to the fact that certain critical conditions exist insofar as maintaining the diatomite in suspension and causing it to slowly descend down upon the filter bed in a saturated state while maintaining said critical condition in the manner in which I have just described. I have discovered by repeated experimenting over a long period of time that by following the procedure and maintaining conditions as set forth above, I am able to produce a completely homogeneous and even layer of diatomite upon the sand filter bed with a very minimum of penetration of the diatomite through surface of the sand.

The foregoing procedure insures that my diatomite will remain in proper suspension in the water until it is deposited properly on the surface of the sand. It is part of my discovery that thus maintaining the pressure as disclosed tends to stabilize the suspension of the diatomite in water.

Maintaining the velocity of the suspension of diatomite in water at the critical range which I have discovered and which is disclosed herein, while it flows through the filter, insures that the diatomite will be deposited uniformly and completely over the sand bed. I have discovered that if the velocity exceeds the critical range disclosed herein, the diatomite will tend to deposit around the outer circumference of the filter leaving a hole in the center in the form of a doughnut. If the velocity is less than the critical range, the diatomite will tend to pile up in the center leaving the outer circumference bare. Variations in velocity will produce varying bald spots.

By maintaining the above conditions moreover, no excessive inequalities of pressure build up across the filter bed and the diatomite is therefore not forced into the bed excessively but merely enough to properly fill the voids in the sand.

EXAMPLE

A specific example of a successful installation using the method of my invention follows:

For this installation I used a combination of two different grades of diatomite upon a sand filter bed. The first, or coarse layer, was comprised of a brand known as "Celite 545" and the second or final layer was known as "Filter-Cel." Both of these are commercial grades manufactured by the Johns-Manville Company. These were applied to a sand filter bed of a generally accepted commercial type in which ten percent by weight of the sand grains were less than .50 mm. in diameter and ninety percent were coarser (effective size E.S.). Of the coarser, 60 percent was finer than .61 mm. (uniformity coefficient U.C.). Other conditions were as follows:

| | |
|---|---|
| Pressure developed by a booster pump | 50 p.s.i. |
| Diameter of filter | 72 in. |
| Area of filter | 28.27 sq. ft. |
| Amount of diatomite dry basis (minimum) | 4 lbs. of each or 2.25 ounces per sq. ft. of filter area. |
| Thickness of top diatomite layer after deposition | $\frac{1}{16}$ in. |
| Thickness of bottom diatomite layer after deposition | $\frac{1}{16}$ in. |
| Deepest penetration into sand bed | $\frac{3}{8}$ in. |
| Smallest penetration into sand bed | $\frac{3}{16}$ in. |

After the above application was made the filter was opened and examined internally after each two weeks of normal operation. This constituted one hundred and sixty hours of operation and the filtration of five hundred and forty thousand gallons of water. The filter bed of diatomite was completely intact, there were no holes or openings anywhere, and the penetration of diatomite into the sand was approximately as shown above. The quality of the water obtained from the filter was far superior to that obtained on the same filter without the diatomite, even after back-washing the filter in the case of sand only after each seventy thousand gallons of use, or almost eight times as frequently as with the diatomite. In fact, it was equal in quality to that obtained by filtering the same water through expensive polishing filters.

I claim:

1. A method of applying diatomite to the horizontal sand bed of a sand pressure water filter to effect a filter aid therefore comprising the steps:
   mixing a measured quantity of diatomite with water;
   maintaining said diatomite in suspension in said water;
   pumping said water containing said diatomite in suspension through said bed at the constant rate of one gallon, plus or minus six percent, per square foot of cross-sectional area of said bed per minute;
      whereby said diatomite is deposited in a complete even layer over said bed and fills the voids in the surface of said bed.

2. The method of claim 1 including the additional steps:
   mixing a second measured quantity of diatomite with water;
      said second quantity having a degree of fineness smaller than the first measured quantity of diatomite;
   maintaining said second quantity in suspension;
   pumping said water containing said diatomite in suspension through said bed at the rate of one gallon, plus or minus six percent, per square foot of cross-sectional area of said bed per minute,
      whereby said diatomite is deposited in a complete and discrete layer over the surface of the first layer of diatomite.

3. The method of claim 1 in which the predetermined quantity of diatomite is approximately 2.25 ounces per square foot of area of said bed.

4. A method of applying a diatomite filter zone over the horizontal sand filter bed of a sand pressure water filter comprising the steps:
   adjusting a flow of water under pressure through said filter bed at a constant rate of one gallon, plus or minus six percent, per square foot of cross-sectional area of said bed per minute;
   thoroughly mixing and suspending a predetermined quantity of diatomite into water under pressure;
   introducing said suspension of diatomite and water into said flow of water through said filter bed;
      whereby there is formed a complete, continuous and homogeneous layer of diatomite over the surface of said bed and into the voids in said surface.

5. A method of applying a diatomite filter layer on the top horizontal surface of a sand pressure water filter bed comprising the steps:
   supplying a flow of water vertically into said filter bed;
   adjusting the flow of said water to maintain the constant rate of one gallon, plus or minus six percent, per square foot per minute of cross-sectional area of said bed;
   dispersing a predetermined quantity of diatomite into water to effect a suspension of said diatomite in said water;
   introducing said suspension of diatomite and water into said flow of water into said filter bed;
      whereby there is produced a uniform, continuous and homogeneous layer of diatomite on the top horizontal surface of said bed.

6. A method of applying a diatomite filter layer over the horizontal sand bed of a sand filter located at the base of the tank of a pressure water filter comprising the steps:
   supplying a flow of water into the top of said tank;
   adjusting the flow of said water to maintain the constant rate of one gallon, plus or minus six percent, per square foot per minute of cross-sectional area of said bed;
   dispersing a predetermined quantity of diatomite into water to effect a suspension of said diatomite in said water;
   introducing said suspension of diatomite and water into said flow of water into said tank;
   permitting said suspension of diatomite and water to flow down inside said tank and upon said bed thereby causing said diatomite to deposit itself upon said bed at a predetermined rate;
      whereby there is produced a uniform, continuous and homogeneous layer of diatomite on the top surface of said bed and into the voids in said surface.

7. A filter bed for a pressure water filter comprising:
a plate positioned close to the bottom of said filter;
a layer of coarse sand positioned on top of said plate;
a layer of fine sand positioned on top of said layer of coarse sand;
a layer of diatomite positioned on top of said layer of fine sand;
   said layer of diatomite being continuous and homogeneous and completely filling the voids in the surface of said fine sand;
said layer of fine sand being completely covered by said diatomite so that no areas of the upper surface of said layer are directly exposed to the flow of water therethrough.

8. The filter bed of claim 7 in which said layer of diatomite is not over one-sixteenth of an inch thick above the top surface of said sand.

9. The filter bed of claim 7 in which the deepest penetration of said diatomite into the voids of said fine sand is not over three-eighths of an inch.

10. A filter for the filtration of water under pressure comprising:
a vessel;
a bed of granular material positioned within said vessel;
a first layer of homogeneous diatomite positioned upon the upper surface of said bed of granular material;
   said first layer of diatomite characterized by its complete filling of the voids in the surface of said bed of granular material;
a second layer of homogeneous diatomite positioned upon the upper surface of said first layer of diatomite;
   said second layer of diatomite characterizated by its complete filling of the voids in the surface of said first layer of diatomite.

References Cited by the Examiner

UNITED STATES PATENTS

| | | | |
|---|---|---|---|
| 1,579,171 | 3/1926 | Zoul | 210—75 X |
| 2,051,126 | 8/1936 | Baxter et al. | 210—290 X |
| 2,661,244 | 12/1953 | Baily | 210—193 X |
| 3,199,677 | 8/1965 | Schneider | 210—193 X |

FOREIGN PATENTS 541,909   4/1956   Italy.

REUBEN FRIEDMAN, *Primary Examiner.*

D. M. RIESS, *Assistant Examiner.*